Jan. 5, 1932.  E. L. BENOIT  1,839,528
RATCHET LIFT
Filed May 31, 1928   2 Sheets-Sheet 1
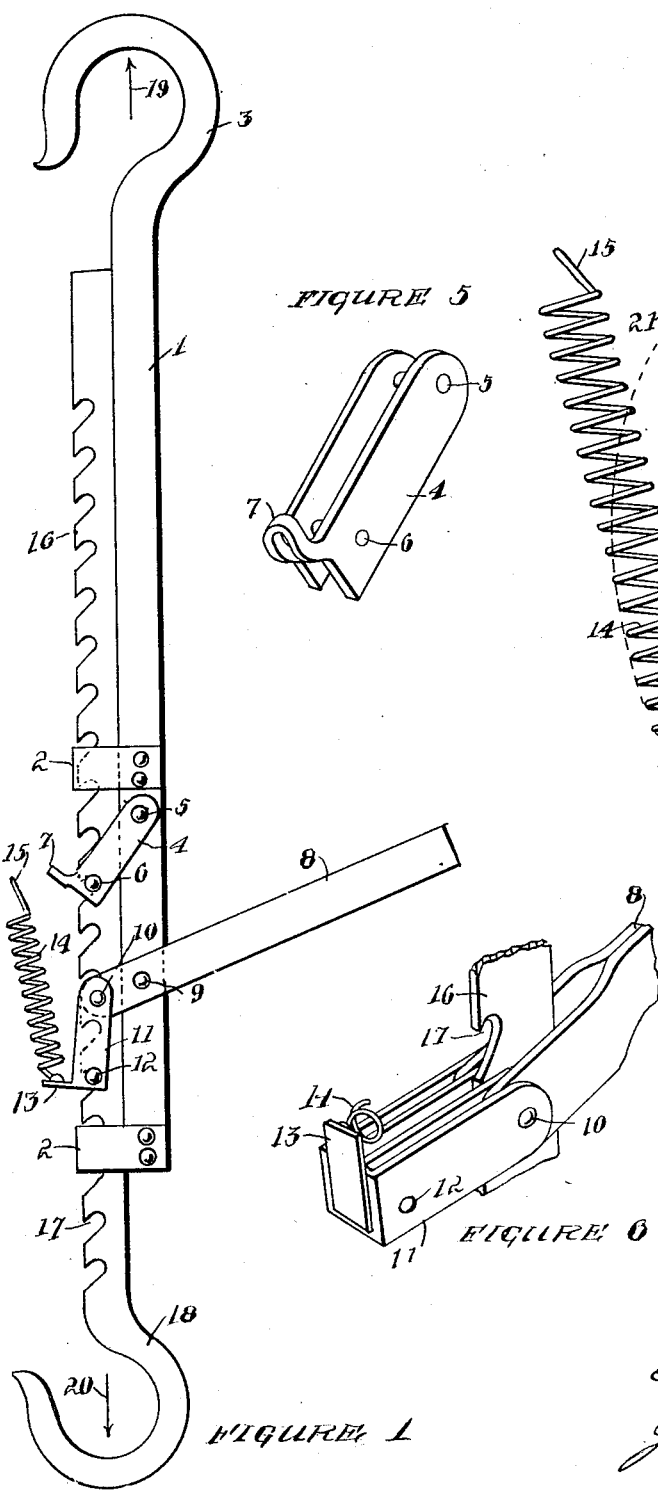
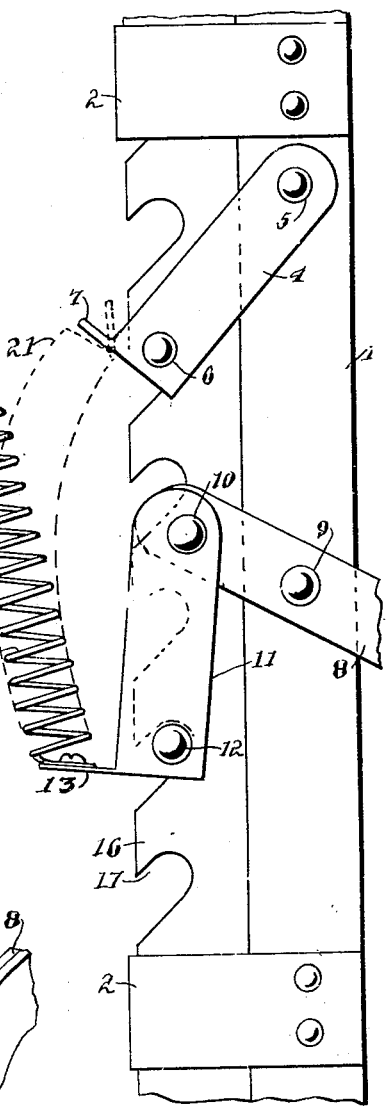
INVENTOR
Edmund L. Benoit
John A. Naismith
ATTORNEY Jan. 5, 1932.    E. L. BENOIT    1,839,528
RATCHET LIFT
Filed May 31, 1928    2 Sheets-Sheet 2

INVENTOR
Edmund L. Benoit
John A. Naismith
ATTORNEY

Patented Jan. 5, 1932

1,839,528

UNITED STATES PATENT OFFICE

EDMUND L. BENOIT, OF SAN JOSE, CALIFORNIA

RATCHET LIFT

Application filed May 31, 1928. Serial No. 281,816.

It is one object of the invention to provide a device of the character indicated that will be light, strong, and durable, and as positive in action when lowering a load as when raising it.

It is also an object of the invention to provide a device of the character indicated that will be substantially rigid when supporting a suspended weight, and one that is provided with positively acting means cooperating with both actuating and supporting dogs to disengage the same from a ratchet at predetermined periods.

It is a still further object of the invention to provide a device of the character indicated that will be economical to manufacture, simple in construction, and highly efficient in its practical application.

In the drawings:

Figure 1 is a side elevation of the device.

Figure 2 is an enlarged side elevation of a portion of the device with the dog throwing means in position for throwing the upper dog when the operating lever is forced downwardly.

Figure 5 is a detail perspective view of the upper dog.

Figure 6 is a detail perspective of the lower dog and a portion of the ratchet bar and lever.

Figure 3:
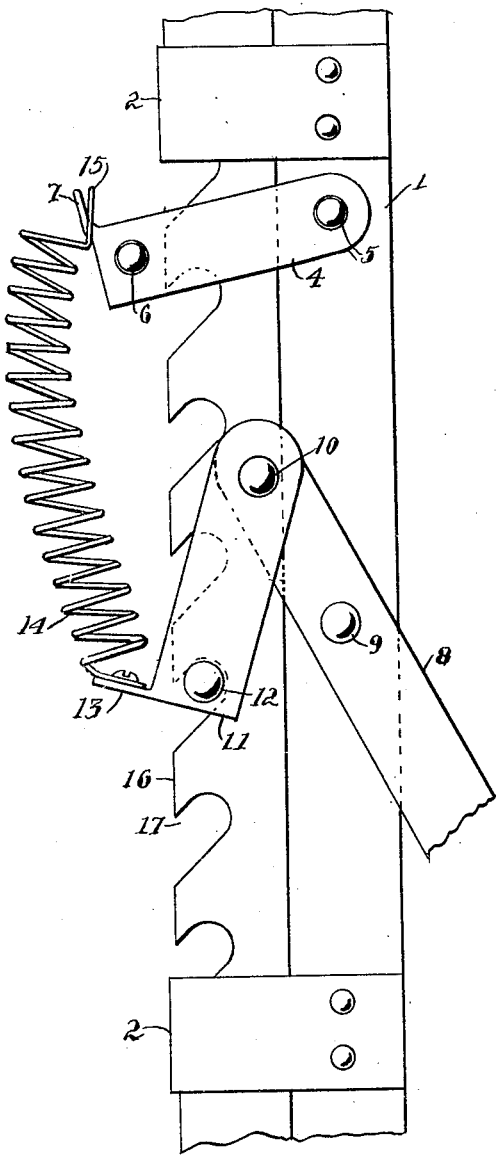
Figure 3 is a similar view showing the upper dog when thrown by the dog throwing means and with the lower dog engaging the ratchet bar.

Referring now more particularly to the drawings, I show at 1 a supporting bar fitted with guides 2 and provided with a hook at its upper end as at 3 whereby it may be suspended from any suitable fixed member not shown. Pivotally mounted on the bar 1 and just below the upper guide is a dog 4, its pivotal point being indicated at 5. In the outer end of the dog is the pin 6 by means of which it engages the ratchet bar hereinafter described, and on the free end of the dog 4 is an upstanding finger 7.

A lever is shown at 8 pivotally mounted as at 9 to the bar 1 substantially midway between the guides 2, and to the end of the short arm of the lever is pivotally mounted as at 10 a dog 11. In the outer end of the dog 11 is the pin 12 by means of which it engages the ratchet bar to be described, and on the free end of the dog is an upstanding plate 13. On the face of this plate 13 directed toward the pivotal point 10 is mounted one end of a coiled spring 14, the other end of the spring being formed into a loop 15 adapted to engage the finger 7 on dog 4.

At 16 is shown a ratchet bar slidably mounted in guides 2 with its rear edge engaging the bar 1 and having upwardly and inwardly directed notches as 17 formed in its outer edge. In the present case the lower end of the bar is formed into a hook 18 by means of which it may be attached to a weight to be raised.

With the support indicated by the arrow 19 and the weight indicated by the arrow 20, the operation of the device is as follows, the spring 14 being disconnected from the dog 4 as shown in Figure 1. Since both dogs 4 and 11 are overbalanced at least one of them is in engagement with the ratchet bar at all times. By raising the lever 8 the dog 11 will slide down the bar to engage the next lower notch, and by forcing the lever downwardly the bar 16 will be raised relative to bar 1 and the upper dog 4 will slide over the bar 16 to engage the next lower notch. Repetition of this action will of course keep the bar 16 moving upwardly.

Figure 4:
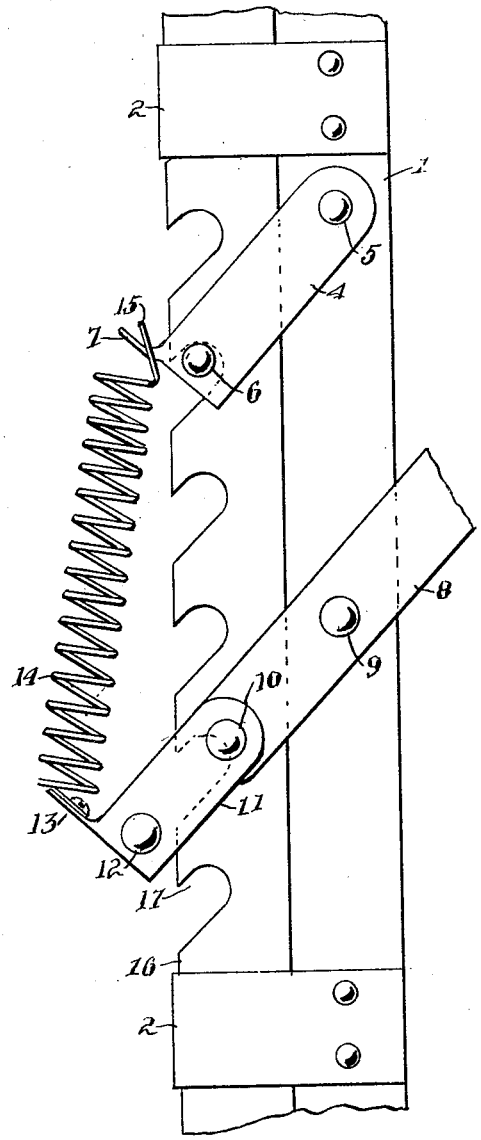
Figure 4 is another similar view showing the relative positions of the parts when the lever is raised to permit the upper dog to engage the ratchet bar and support the load.

For lowering the bar 16 relative to bar 1 the loop 15 on spring 14 is placed in engagement with the finger 7 on dog 4 as indicated in dotted lines at 21. If now the lever 8 is swung downwardly a little so that the pin 6 in dog 4 will clear the point of the notch in which it rests then the spring 14, bowed outwardly by this action, will throw the dog outwardly and clear of the ratchet as shown in Figure 3, the ratchet bar 16 and its load being now supported entirely by the lever and dog 11. The load may now be lowered by swinging the lever 8 upwardly, but when the lever approaches the position shown in Figure 4 it places just enough tension on the spring 14 to again throw the dog 4 into engagement with a notch in the ratchet bar and hold the dog 11 free as shown. When the lever is again swung downwardly the spring 14 is bowed outwardly and the dog 11 moves into engagement with a notch, whereupon the bar 16 is raised enough to permit the freeing of dog 4 and the bar 16 is lowered another notch, the action being repeated as desired.

It may now be seen that by assembling the several elements in the manner above set forth the same operation of the lever 8 will either raise or lower the load, depending entirely upon whether or not the spring 14 is connected to the dog 4.

It will be noted that whenever the device is operated to bow the spring as described its tendency is to urge the upper dog out of the ratchet and the lower one into the ratchet, while straightening the spring urges the upper dog into the ratchet and the lower one out of the ratchet.

It is to be understood, of course, that while I have herein shown and described but one specific embodiment of the invention, changes in form, construction, and method of assembly and operation may be made within the scope of the appended claim.

I claim:

A device of the character described comprising a pair of relatively slidable bars and means for supporting one bar relative to the other bar, one bar having a ratchet formed therein, a dog mounted on the other bar to normally engage said ratchet, a lever fulcrumed on the second bar in spaced relation to said dog and having a short arm overlying the ratchet bar, a dog mounted on the short arm of the lever to normally engage said ratchet, and resilient means inserted between the dogs to urge them in opposite directions about their pivotal mountings and to alternately displace one dog and then the other from engagement with the ratchet upon movement of the lever.

EDMUND L. BENOIT.